United States Patent
Betts et al.

(10) Patent No.: US 8,560,701 B2
(45) Date of Patent: Oct. 15, 2013

(54) METHOD AND APPARATUS FOR WEB SERVICE COMMUNICATION

(75) Inventors: Christopher Betts, Mount Dandenong (AU); Tony Rogers, Rowville (AU)

(73) Assignee: CA, Inc., Islandia, NY (US)

( * ) Notice: Subject to any disclaimer, the term of this patent is extended or adjusted under 35 U.S.C. 154(b) by 1912 days.

(21) Appl. No.: 11/132,708

(22) Filed: May 19, 2005

(65) Prior Publication Data
US 2006/0031414 A1 Feb. 9, 2006

Related U.S. Application Data

(60) Provisional application No. 60/573,598, filed on May 21, 2004.

(51) Int. Cl.
*G06F 15/16* (2006.01)

(52) U.S. Cl.
USPC .......................... 709/227; 709/203

(58) Field of Classification Search
USPC ......................... 709/219, 227, 203
See application file for complete search history.

(56) References Cited

U.S. PATENT DOCUMENTS

| | | | |
|---|---|---|---|
| 6,154,777 A * | 11/2000 | Ebrahim | 709/227 |
| 6,356,930 B2 * | 3/2002 | Garg | 709/201 |
| 7,249,100 B2 * | 7/2007 | Murto et al. | 705/50 |
| 2002/0178244 A1 * | 11/2002 | Brittenham et al. | 709/223 |
| 2003/0191802 A1 * | 10/2003 | Zhao et al. | 709/203 |
| 2004/0043758 A1 * | 3/2004 | Sorvari et al. | 455/414.1 |
| 2004/0078593 A1 * | 4/2004 | Hind et al. | 713/201 |
| 2004/0128544 A1 * | 7/2004 | Hondo et al. | 713/201 |
| 2004/0207659 A1 * | 10/2004 | Goodman et al. | 345/762 |
| 2005/0165656 A1 * | 7/2005 | Frederick et al. | 705/26 |
| 2005/0209984 A1 * | 9/2005 | Brown et al. | 707/1 |
| 2006/0155842 A1 * | 7/2006 | Yeung et al. | 709/224 |
| 2007/0226294 A1 * | 9/2007 | Pruitt et al. | 709/203 |
| 2008/0034372 A1 * | 2/2008 | Ganesan et al. | 719/311 |

OTHER PUBLICATIONS

Boubez et al, "UDDI Programmers API 1.0 UDDI OPen Draft Specification Sep. 30, 2000", Sep. 30, 2000, IBM, p. 1-68.*
"UDDI Technical White Paper" Sep. 6, 2000, Microsoft, p. 1-13.*

* cited by examiner

*Primary Examiner* — Karen Tang
(74) *Attorney, Agent, or Firm* — Baker Botts, LLP

(57) ABSTRACT

Methods and apparatuses for web service communication are provided. A first communication is received for a web service that comprises a first address. A second address is then located corresponding to the first address. A second communication, including the request in the first communication, is sent the second address, and the response returned to the originator.

29 Claims, 6 Drawing Sheets

METHOD AND APPARATUS FOR WEB SERVICE COMMUNICATION

CROSS-REFERENCE TO RELATED APPLICATION

This application claims the benefit of U.S. provisional application Ser. No. 60/573,598, filed May 21, 2004 and entitled "METHOD AND APPARATUS FOR PROCESSING WEB SERVICE COMMUNICATION".

TECHNICAL FIELD

The present disclosure relates generally to web services and, more particularly, to methods and apparatuses for web service communication.

DESCRIPTION OF THE RELATED ART

Web services are automated resources that can be accessed through the Internet and provide a way for computers to communicate with one another. Web services can use Extensible Markup Language (XML) to transmit data. XML is a human readable language that is used for tagging the data that is used by web services.

A computer system using web services can use a Universal Discovery, Description and Integration (UDDI) protocol. Computer system(s) as referred to herein may include individual computers, servers, computing resources, and/or networks, etc. UDDI is a web-based globally distributed directory that provides information about service providers, service implementations, and service metadata. UDDI is similar to a phone book's yellow pages because it allows service providers, such as businesses, to advertise the services that they offer and allows service consumers to discover services that meet their needs.

The UDDI standard is fundamental to the newly emerging network of web services. However, many applications are unable to take advantage of UDDI to communicate with other web services because the applications may not be UDDI aware (that is, adapted to communicate with others conforming to the UDDI standard).

Furthermore, the manner of locating web service addresses among UDDI aware applications may not be universal. For example, some applications have the capability to make a request to a UDDI repository for a web address, which is then returned to the requesting application. The requesting application can then look up the web service directly by using the address returned by the UDDI repository. Other applications may not have this function.

It is useful for requesting applications to be able to reliably locate a web service address in a universal manner. In addition, it is useful for service providers, such as businesses, to change web addresses for web services without informing requesting applications of such a change.

There remains a need for a reliable and effective way for applications to look up web services efficiently in a universal manner and for service providers to change web addresses without informing applications of the change.

SUMMARY

This application describes methods and apparatuses for web service communication. An apparatus for web service communication, according to an embodiment of the present disclosure, includes a proxy server for receiving a first communication for a web service, the first communication including a first address, and a repository for storing web service addresses accessible by the proxy server, wherein the proxy server locates a second address associated with the first address, and sends a second communication to a requesting application, the second communication including the second address.

According to another embodiment, an apparatus for web service communication includes means for receiving a first communication for a web service, the first communication including a first address, means for locating a second address associated with the first address, and means for providing a second communication to a requesting application, wherein the second communication includes the second address.

A method for web service communication, according to an embodiment of the present disclosure, includes receiving a first communication for a web service, the first communication including a first address, locating a second address associated with the first address, and sending a second communication to a requesting application, wherein the second communication includes the second address.

The methods and apparatuses of this disclosure may be embodied in one or more computer programs stored on a computer readable medium or program storage device and/or transmitted via a computer network or other transmission medium. For example, a computer storage medium including computer executable code for web service communication, according to an embodiment of the present disclosure, includes code for receiving a first communication for a web service, the first communication including a first address, code for locating a second address associated with the first address; and code for sending a second communication to a requesting application, wherein the second communication includes the second address.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methodologies, apparatuses, and systems) for web service communication. The tools provide means for receiving a communication for a web service, with the communication including a first address (such as a public web service address), and then find a second address (such as a real web service address) associated with the first address.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
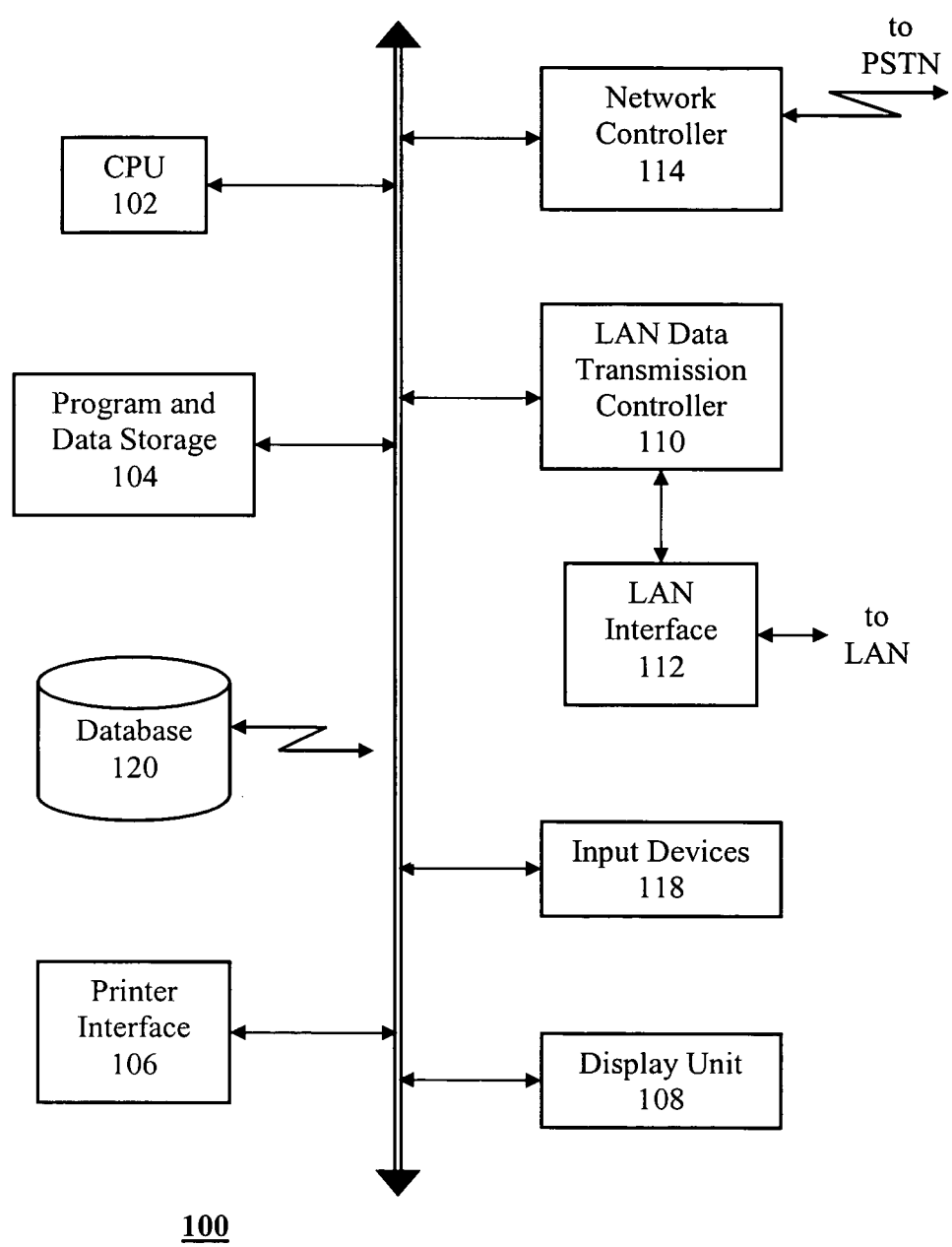
FIG. 1 shows a block diagram of an exemplary computer system capable of implementing the methods and apparatuses of the present disclosure.

FIG. 1 shows an example of a computer system 100 which may implement the methods and apparatuses of the present disclosure. The apparatus and method of the present disclosure may be implemented in the form of a software application running on a computer system, for example, a mainframe, personal computer (PC), handheld computer, server, etc. The software application may be stored on computer readable media or program storage device locally accessible by the computer system, for example, floppy disk, optical disc, hard disk, etc., or may be remote from the computer system and accessible via a hard wired or wireless connection to a computer network (for example, a local area network, the Internet, etc.) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Figure 2:
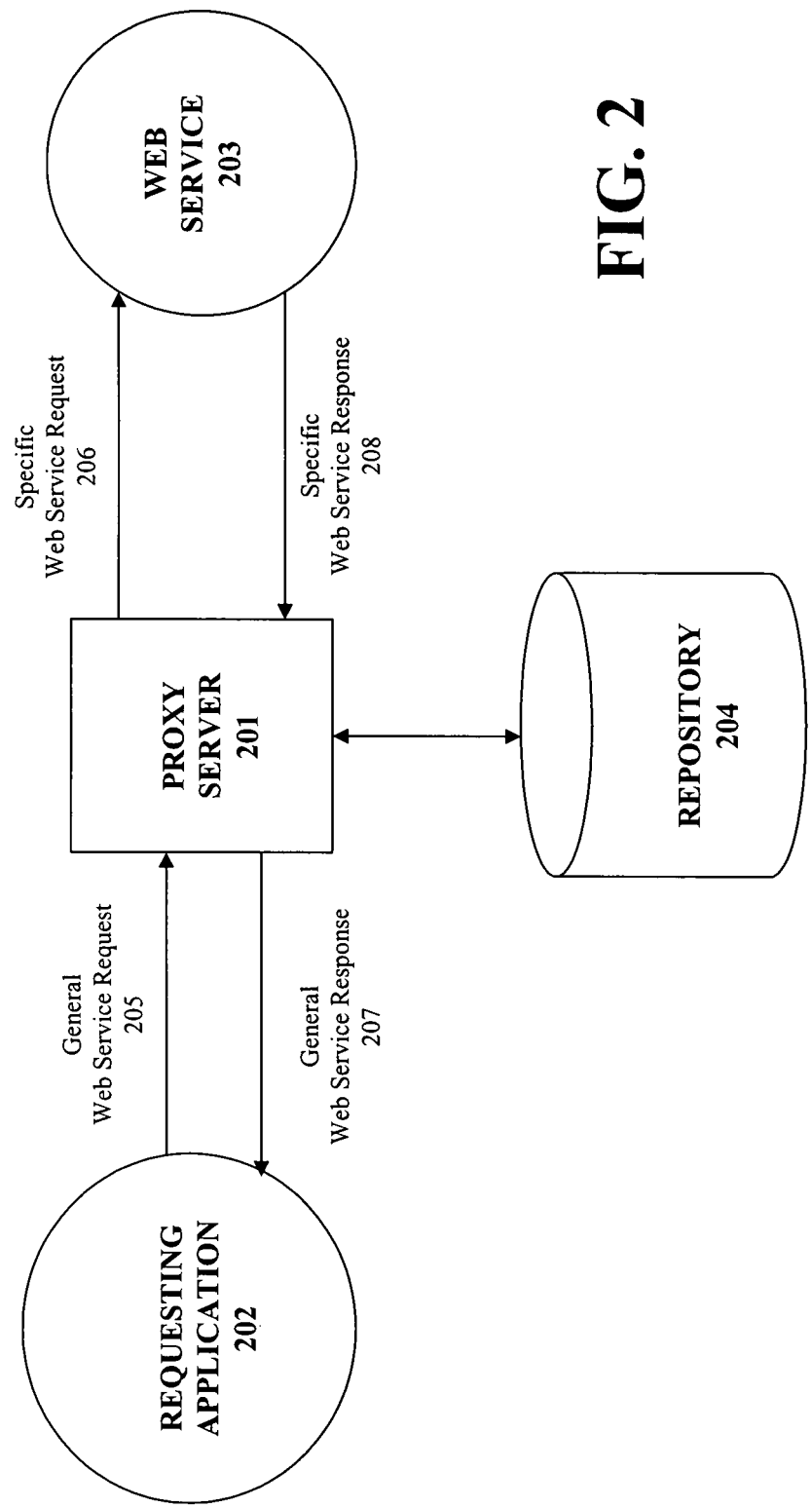
FIG. 2 shows a block diagram illustrating an apparatus for web service communication, according to an embodiment of the present disclosure.

FIG. 2 shows a block diagram illustrating a system for web service communication, according to an exemplary embodiment of the present disclosure. Proxy server 201 can receive a general web service request 205 from a requesting application 202. The general web service request 205 may include a public web service address. The proxy server 201 can match the public web service address 205 to a real web service address through a repository 204 (such as a UDDI repository). Once a match is found, the proxy server 201 can construct a specific web service request 206 using the real web service address, and can send it to the proxied web service 203. The proxied web service 203 can then return a specific web service response 208 to the proxy server 201. The proxy server 201 can match the specific web service response 208 to a general web service response 207 and can send the general web service response 207 to the requesting application 202.

The proxy server can be placed between a requesting application and a web service and can match a public web service address with a real web service address through a look-up table, directory, database, or any another comparable system. The public web service address may comprise the address that is seen by the requesting application, and the real web service address may comprise the actual address or location of the web service.

According to an embodiment of the present disclosure, a user can use a UDDI server as the basis for a proxy server that can provide a constant and unchanging web service address for a particular web service that may actually be moving between different addresses. A UDDI server can store details about web services, for example, what business is responsible for a particular web service, how data is to be presented to that web service, address details, names, and/or other descriptive information. Multiple web service instances (also referred to herein as "bindings") can be entered into the UDDI server. Using this information, a user, such as an organization, can search for a web service that meets certain criteria. For example, a UDDI repository can associate an abstract name, such as "mycompany.com/sales" with a particular server instance, such as "mycompany.com:8080/webServices/server102/sales".

The proxy server can be implemented by redirecting web services messages, such as by looking up the real address of the requested web server in the UDDI server.

Non-UDDI aware requesting applications can use the proxy server and hard code the apparent address of the desired services, while the organization providing the proxy can move the web services around without concerning itself about possibly breaking other programs that may be accessing the web services. For example, if a real web service address changes, then the public web service address is matched to the changed real web service address within the proxy server. The proxy server can update its matching function between public and real addresses from time to time. This update may be either cached or un-cached.

According to another embodiment of the present disclosure, a real web service address is matched to information instead of a public web service address. The information may be included within the request from the requesting application. Furthermore, the real web service address may be determined from a combination of the information and the public web service address.

Figure 3:
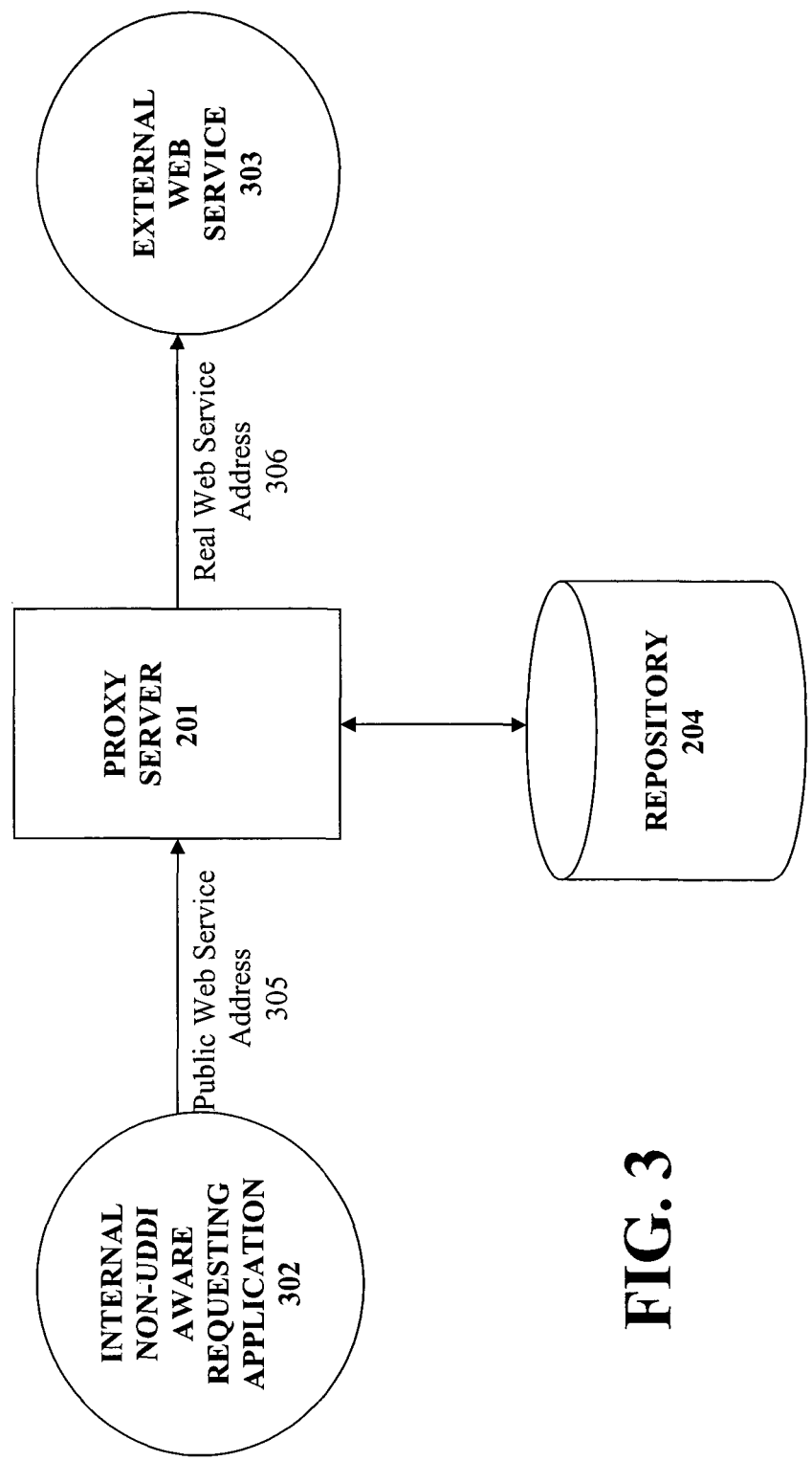
FIG. 3 shows an internal non-UDDI aware requesting application using the proxy server to communicate with an external web service, according to an exemplary embodiment.

FIG. 3 illustrates an internal non-UDDI aware requesting application using the proxy server to communicate with an external web service, according to an embodiment of the present disclosure. Internal non-UDDI aware requesting application 302 may use public web service address 305 when it communicates with proxy server 201. The proxy server 201 can match the public web service address 305 to a real web service address 306 through a repository 206, such as a UDDI repository. The matching of the public web service address 305 to the real web service address 306 may be cached or uncached. The proxy server 201 can use the real web service address 306 to communicate with external web service 303.

Figure 4:
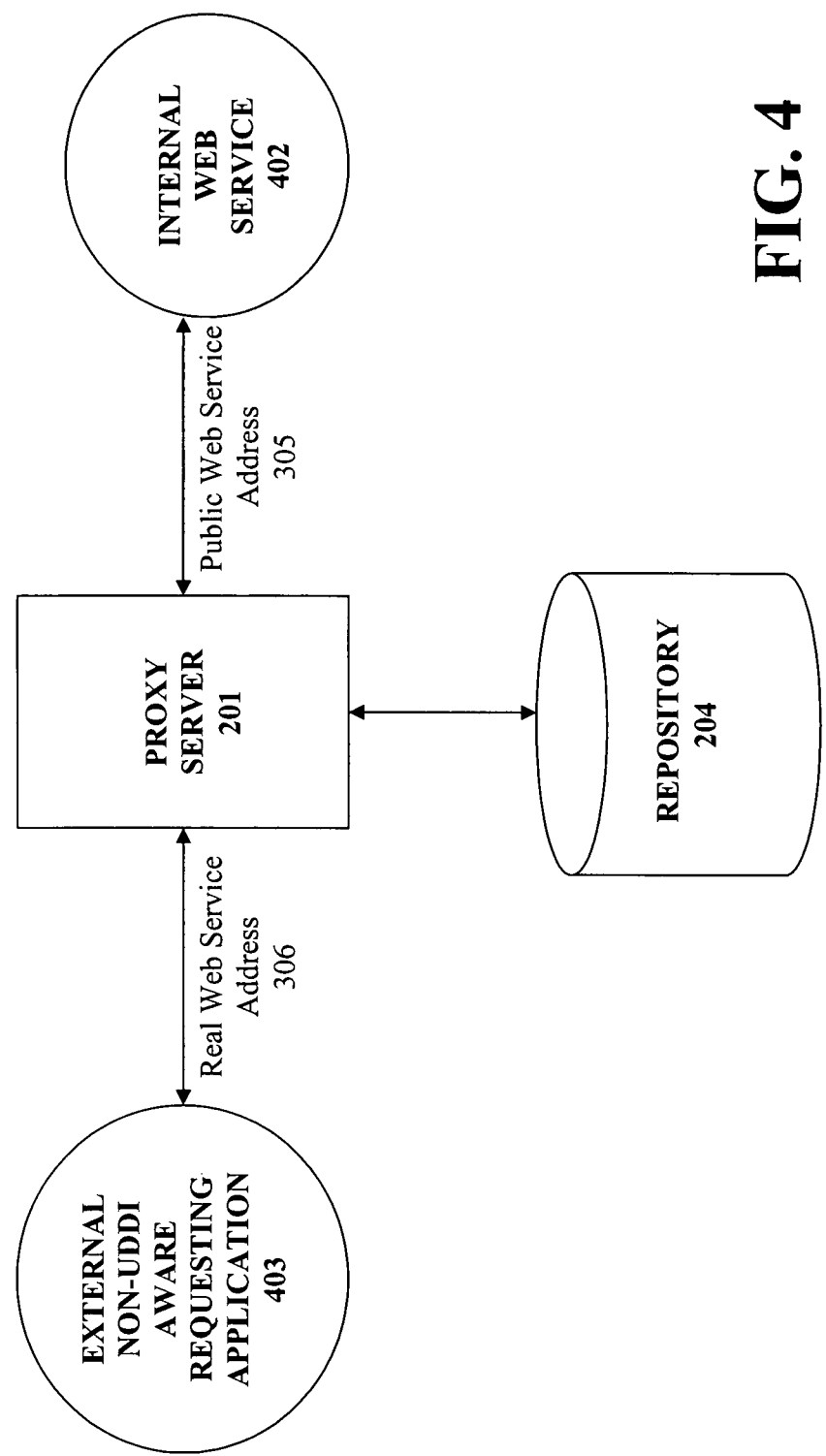
FIG. 4 shows an external non-UDDI aware requesting application using the proxy server to communicate with an internal web service, according to an exemplary embodiment.

FIG. 4 illustrates an external non-UDDI aware requesting application using the proxy server to communicate with an internal web service, according to an embodiment of the present disclosure. The external non-UDDI aware requesting application 403 can use a real web service address 306 when it communicates with proxy server 201. The proxy server 201 can match the real web service address 306 to a public web service address 305 through a repository 204, such as a UDDI repository. The matching of the real web service address 306 to the public web service address 305 may be cached or uncached. The proxy server 201 can forward the public web service address 305 to the non-UDDI aware requesting application 403.

Figure 5:
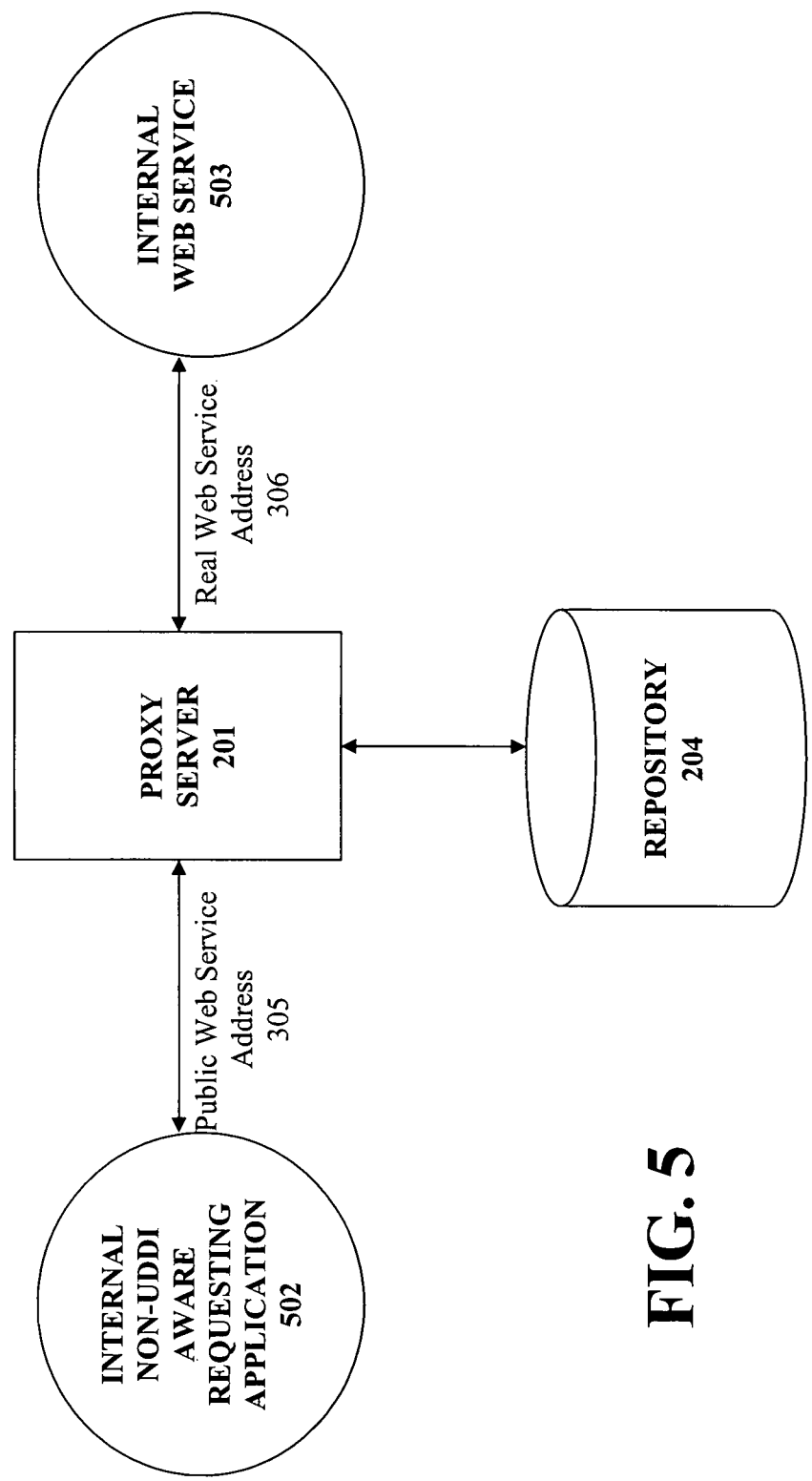
FIG. 5 shows a block diagram illustrating an apparatus for web service communication, according to an exemplary embodiment.

A user, such as an organization, may have non-UDDI aware applications accessing each other. FIG. 5 illustrates an internal system of web service communication, according to an embodiment of the present disclosure. An internal non-UDDI aware requesting application 502 can use a public web service address 305 when it communicates with proxy server 201. The proxy server 201 can match the public web service address 305 to a real web service address 306 through a repository 204, such as a UDDI repository or other internally maintained repository. The proxy server 201 can forward the real web service address 306 to the internal web service 503.

According to an embodiment of the present disclosure, the proxy server in the system of web service communication can be used to hide sensitive information. For example, a web service may include public and private web addresses corresponding to different functions. The proxy server can be used to enable only the public web address and not the private web address.

Figure 6:
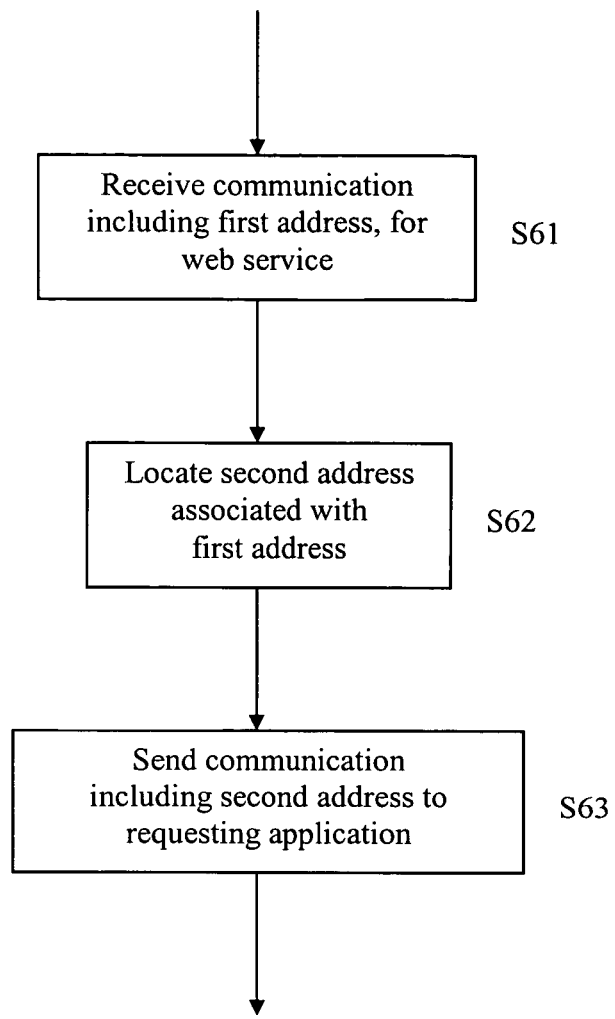
FIG. 6 shows a flow chart illustrating a method for web service communication, according to an embodiment of this disclosure.

A method for web service communication, according to an exemplary embodiment, will be discussed with reference to FIG. 6. A first communication for a web service is received, which includes a first address (step S61). The first address is used to locate a second address which is associated with the first address (step S62). A second communication which includes the second address is sent to a requesting application (step S63).

The specific embodiments described herein are illustrative, and many additional modifications and variations can be introduced on these embodiments without departing from the spirit of the disclosure or from the scope of the appended claims. Elements and/or features of different illustrative embodiments may be combined with each other and/or substituted for each other within the scope of this disclosure, and appended claims.

Additional variations may be apparent to one of ordinary skill in the art from reading U.S. provisional application Ser. No. 60/573,598, filed May 21, 2004 and entitled "METHOD AND APPARATUS FOR PROCESSING WEB SERVICE COMMUNICATION", the entire contents of which are incorporated herein by reference.

What is claimed is:

1. An apparatus for web service communication, comprising:
   a central processing unit implementing a proxy server adapted to receive a first communication requesting a web service, the first communication including a first address identifying the requested web service;
   a Universal Discovery, Description and Integration (UDDI) repository for storing web service addresses accessible by the proxy server; and
   wherein the proxy server locates a second address associated with the first address, and sends a second communication including the second address.

2. The apparatus of claim 1, wherein the first communication is sent from the requesting application.

3. The apparatus of claim 1, wherein the requesting application is an internal application.

4. The apparatus of claim 1, wherein the first address comprises a public address, information associated with the requesting application, or a real web services address associated with the web service.

5. The apparatus of claim 1, wherein the second address comprises a real web services address associated with the web service, public address, or information associated with the requesting application.

6. The apparatus of claim 1, wherein the second address is stored in the repository.

7. The apparatus of claim 1, wherein the repository is a database, a look-up table or a directory.

8. The apparatus of claim 1, wherein the requesting application is an external application.

9. The apparatus of claim 1, wherein the first communication is received from a non-UDDI-aware application.

10. The apparatus of claim 1, wherein the second communication is sent to a requesting application.

11. The apparatus of claim 1, wherein the second communication is sent to a requested application.

12. The apparatus of claim 1, wherein the web service is an external web service.

13. The apparatus of claim 1, wherein the web service is an internal web service.

14. The apparatus of claim 1, wherein the association of the first address and the second address is cached.

15. An apparatus for web service communication, comprising:
    means for receiving a first communication requesting a web service, the first communication including a first address identifying the requested web service;
    means for locating a second address associated with the first address, wherein the second address is stored in a Universal Discovery, Description and Integration (UDDI) repository; and
    means for providing a second communication to a requesting application, wherein the second communication includes the second address.

16. A method for web service communication, comprising:
    receiving, at a proxy server, a first communication requesting a web service, the first communication including a first address identifying the requested web service;
    locating a second address associated with the first address, wherein the second address is stored in a Universal Discovery, Description and Integration (UDDI) repository;
    sending, from the proxy server, a second communication requesting the web service, using the second address;
    in response to the second communication, receiving, at the proxy server, a first web service response from the web service;
    matching the first web service response to a second web service response; and
    sending the second web service response to a requesting application.

17. The method of claim 16, wherein the first communication is sent from the requesting application.

18. The method of claim 16, wherein the requesting application is an internal application.

19. The method of claim 16, wherein the first address comprises a public address, information associated with the requesting application, or a real web services address associated with the web service.

20. The method of claim 16, wherein the second address comprises a real web services address associated with the web service, public address, or information associated with the requesting application.

21. The method of claim 16, wherein the repository is a database, a look-up table or a directory.

22. The method of claim 16, wherein the second communication includes a request included in the first communication.

23. A computer system comprising:
    a processor; and
    a program storage device readable by the computer system, tangibly embodying a program of instructions executable by the processor to perform the method claimed in claim 16.

24. A program storage device readable by a machine, tangibly embodying a program of instructions executable by the machine to perform the method claimed in claim 16.

25. The method of claim 16, wherein the requesting application is an external application.

26. The method of claim 16, wherein the first communication is received from a non-UDDI-aware application.

27. The method of claim 16, wherein the web service is an external web service.

28. The method of claim 16, wherein the web service is an internal web service.

29. The method of claim 16, wherein the association of the first address and the second address is cached.

\* \* \* \* \*

UNITED STATES PATENT AND TRADEMARK OFFICE
CERTIFICATE OF CORRECTION

| | | |
|---|---|---|
| PATENT NO. | : 8,560,701 B2 | Page 1 of 1 |
| APPLICATION NO. | : 11/132708 | |
| DATED | : October 15, 2013 | |
| INVENTOR(S) | : Christopher Betts et al. | |

It is certified that error appears in the above-identified patent and that said Letters Patent is hereby corrected as shown below:

On the Title Page

Item (57) Abstract, line 6, please change "sent the" to -- sent to the --

Signed and Sealed this
Third Day of June, 2014

Michelle K. Lee
*Deputy Director of the United States Patent and Trademark Office*